United States Patent
Van Leeuwen et al.

(10) Patent No.: US 11,232,565 B2
(45) Date of Patent: Jan. 25, 2022

(54) EXAMINING DEVICE FOR PROCESSING AND ANALYZING AN IMAGE

(71) Applicant: KONINKLIJKE PHILIPS N.V., Eindhoven (NL)

(72) Inventors: Marinus Bastiaan Van Leeuwen, Eindhoven (NL); Jelte Peter Vink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/301,518

(22) PCT Filed: Mar. 31, 2015

(86) PCT No.: PCT/EP2015/057045
§ 371 (c)(1),
(2) Date: Oct. 3, 2016

(87) PCT Pub. No.: WO2015/150392
PCT Pub. Date: Oct. 8, 2015

(65) Prior Publication Data
US 2017/0116734 A1 Apr. 27, 2017

(30) Foreign Application Priority Data
Apr. 3, 2014 (EP) .................................... 14163311

(51) Int. Cl.
*G06K 9/00* (2006.01)
*G06T 7/00* (2017.01)
(Continued)

(52) U.S. Cl.
CPC .......... *G06T 7/0014* (2013.01); *G06K 9/0014* (2013.01); *G06K 9/3233* (2013.01);
(Continued)

(58) Field of Classification Search
CPC . G06T 2207/10056; G06T 2207/30024; G06T 2207/30096; G06T 7/0014;
(Continued)

(56) References Cited

U.S. PATENT DOCUMENTS 4,761,075 A * 8/1988 Matsushita ........ G01N 15/1468
356/39
6,058,322 A 5/2000 Nishikawa
(Continued)

FOREIGN PATENT DOCUMENTS

| JP | 2009063508 A | 3/2009 |
| RU | 120799 U1 | 9/2012 |
| WO | 200139122 A1 | 5/2001 |

OTHER PUBLICATIONS

Nandy, Kaustav et al "Automatic Nuclei Segmentation and Spatial FISH Analysis for Cancer Detection" 31st Annual International Conference of the IEEE Engineering in Medicine and Biology Society, 2009, pp. 6718-6721.
(Continued)

*Primary Examiner* — Avinash Yentrapati
(74) *Attorney, Agent, or Firm* — Sherry Austin

(57) ABSTRACT

The present invention relates to an examining device (1) for processing and analyzing an image of a bio sample, an examining method for processing and analyzing an image of a bio sample, a computer program element for controlling such device (1), and a corresponding computer readable medium. The examining device (1) for processing and analyzing an image of a bio sample comprises an interface unit, an image analyzing unit, and a display unit. The interface unit is configured to provide an image of a bio sample. The image analyzing unit is configured to indicate a region of interest in the image as reference region, to extract a characteristic of the reference region from the image and to analyze the image for alternative regions with
(Continued)

a similar characteristic. The display unit is configured to display the result of the analysis for alternative regions with a similar characteristic.

19 Claims, 3 Drawing Sheets

(51) Int. Cl.
*G06K 9/32* (2006.01)
*G06T 7/73* (2017.01)
*G06K 9/46* (2006.01)

(52) U.S. Cl.
CPC .......... *G06K 9/4604* (2013.01); *G06T 7/0012* (2013.01); *G06T 7/74* (2017.01); *G06T 2207/10056* (2013.01); *G06T 2207/20104* (2013.01); *G06T 2207/30024* (2013.01); *G06T 2207/30096* (2013.01)

(58) Field of Classification Search
CPC ............... G06T 7/74; G06T 7/0012; G06T 2207/20104; G06K 9/0014; G06K 9/3233; G06K 9/4604
See application file for complete search history.

(56) References Cited

U.S. PATENT DOCUMENTS

| | | | |
|---|---|---|---|
| 2002/0003895 A1 | 1/2002 | Some | |
| 2005/0136509 A1* | 6/2005 | Gholap | G01N 33/5091 435/40.5 |
| 2009/0214096 A1* | 8/2009 | Andrushkiw | G06K 9/00147 382/131 |
| 2009/0257640 A1* | 10/2009 | Gossage | G06T 7/11 382/133 |
| 2010/0128988 A1* | 5/2010 | Kincaid | G06K 9/6253 382/199 |
| 2010/0150423 A1* | 6/2010 | Hong | G06K 9/342 382/133 |
| 2010/0278425 A1 | 11/2010 | Takemoto | |
| 2010/0279341 A1* | 11/2010 | Steiner | G01N 15/1475 435/40.5 |
| 2011/0127444 A1* | 6/2011 | Ozasa | G01N 15/147 250/458.1 |
| 2012/0045790 A1 | 2/2012 | Van Dijk | |
| 2012/0069049 A1 | 3/2012 | Howe | |
| 2012/0147010 A1* | 6/2012 | Schmidt | G06T 19/00 345/440 |
| 2012/0327211 A1* | 12/2012 | Yamamoto | G16H 10/40 348/79 |
| 2013/0089249 A1 | 4/2013 | Mueller | |
| 2013/0230230 A1* | 9/2013 | Ajemba | G06K 9/00147 382/133 |
| 2014/0176602 A1* | 6/2014 | Yoshihara | G06T 11/60 345/629 |
| 2014/0193052 A1* | 7/2014 | Yoshihara | G01N 33/4833 382/128 |
| 2015/0262329 A1* | 9/2015 | Vink | G01N 1/28 435/6.11 |
| 2016/0042511 A1* | 2/2016 | Chukka | G06T 7/0012 382/133 |
| 2016/0155238 A1* | 6/2016 | Bachschmidt | A61B 5/743 382/131 |
| 2017/0103521 A1* | 4/2017 | Chukka | G06T 7/0012 |
| 2017/0116734 A1* | 4/2017 | Van Leeuwen | G06K 9/4604 |

OTHER PUBLICATIONS

Vink, J.P. et al "Image Analysis for Digital Pathology: Local HER2 Scoring", Technical Note: PR-TN-2012/00642, 2013.
Vink, J.P. et al. "Efficient Nucleus Detector in Histopathology Images", Journal of Microscopy, vol. 249, 2013, pp. 124-135.
McNaughton, Andrew "Analysing Matching Regions of Interest in Multiple Images Using Fiji/ImageJ", 2001.
Becette, V. et al "Gene transcript assay by real-time RT-PCR in epithelial breast cancer cells selected by laser microdissection", International Journal of Biological Markers, 2004, vol. 19, No. 2, Abstract Only.
Boykov Y Y et al., "Interactive Graph Cuts for Optimal Boundary & Region Segmentation of Objects in N-D Images", Proceedings of the Eight I EEE International Conference on Computer Vision (ICCV), Vancouver, British Columbia, Canada, Jul. 7-14, 2001; International Conference on Computer Vision, Los Alamitos, CA, vol. 1, Jul. 7, 2001, pp. 105-112, XP010553969.
Acosta-Mesa H.G. et al., "Cervical Cancer Detection Using Colposcopic Images: a Temporal Approach", Computer Science, 2005. ENC 2005. Sixth Mexican International Conference on Puebla, Mexico, Sep. 26-30, 2005, pp. 158-164, XP010892506.

* cited by examiner

EXAMINING DEVICE FOR PROCESSING AND ANALYZING AN IMAGE

CROSS-REFERENCE TO PRIOR APPLICATIONS

This application is the U.S. National Phase application under 35 U.S.C. § 371 of International Application No. PCT/EP2015/057045, filed on Mar. 31, 2015, which claims the benefit of European Patent Application No. 14163311.5, filed on Apr. 3, 2014. These applications are hereby incorporated by reference herein.

FIELD OF THE INVENTION

The present invention relates to an examining device for processing and analyzing an image of a bio sample, an examining method for processing and analyzing an image of a bio sample, a computer program element for controlling such device, and a corresponding computer readable medium. This invention was conducted within the framework of the Life Science for Health ("LSH") program.

BACKGROUND OF THE INVENTION

Pathology diagnostic investigation of patient material (tissue and cells) is the basis of many treatment decisions, in particular in oncology. Standard, thin slices from a biopsy are presented on microscope slides and stained according to certain protocols to visualize the morphology of the tissue. Assessment generally occurs with a bright field microscope.

US 2012/045790 A1 discloses a method for use in biology, histology, and pathology. It comprises providing a digital first image of a first slice of an object comprising biological material; generating a digital second image of a second slice of the object; determining a region of interest in the second image on the basis of a region of interest in the first image; determining a region of interest in the second slice on the basis of the region of interest in the second image; and extracting material from the region of interest in the second slice.

Currently, a selection of a region-of-interest (ROI) is done manually, which is inaccurate, as well as cumbersome. Besides, better or alternative regions in the tissue can be overlooked. Other regions can be better for different reasons. One reason can be that the region contains more relevant cells/material for a subsequent analysis. Another reason can be that the region is more homogeneous, improving the sensitivity and specificity as well as the reproducibility.

SUMMARY OF THE INVENTION

Hence, there may be need to provide an examining device for processing and analyzing an image of a bio sample, wherein in particular the selection of a region-of-interest (ROI) is improved.

The object of the present invention is solved by the subject-matters of the independent claims, wherein further embodiments are incorporated in the dependent claims.

According to the present invention, an examining device for processing and analyzing an image of a bio sample is presented. It comprises an interface unit, an image analyzing unit, and a display unit. The interface unit is configured to provide an image of a bio sample, and can be e.g. an interface to a scanner device to digitize the bio sample. The image analyzing unit is configured to indicate a region of interest in the image as reference region, to extract a characteristic of the reference region from the image and to analyze the image for alternative regions with a similar characteristic. The display unit is configured to display the result of the analysis for alternative regions with a similar characteristic.

In other words and exemplarily, it is proposed to assist e.g. a pathologist during the ROI selection. The pathologist can manually indicate the (rough) location of the ROI. The tissue in this ROI can be used as a reference for the cells/tissue characteristic that is of interest to the pathologist.

Using image analysis, characteristic (cell/nuclei) features of the selected area can be extracted. Further, characteristics of the tissue morphology, like e.g. the nuclei density or variation in cell/nuclei shape or type in the region can be extracted.

In the context, "similar" characteristic means the deviation between the characteristic extracted from the reference region and that extracted from an alternative region is less than ±30%, preferably less than ±20%, more preferably less than ±10%, and even more preferably less than ±5%.

Next, the complete tissue sample is scanned for areas that exhibit similar characteristics. Further, the heterogeneity of the sample can be determined, e.g. by measuring the percentage of tumour cells in each alternative region. As a large percentage of tumour cells have a negative impact on the quality of a subsequent analysis, such regions can be avoided.

If alternative candidate regions are detected, the user can be made aware of them by means of visual feedback. Alternative regions can be highlighted on the screen with a specific colour. Different colours can be used to indicate the reason why these regions are being considered as alternative. For example, to draw extra attention to alternative regions that exhibit better homogeneity, additional detailed information (e.g. about size or homogeneity) for each region can be presented to the user via text boxes or in overlay.

In the meaning of the invention, a bio sample to be examined may be any biological material, a tissue sample, a smear, a cytology sample, a body sample or the like. It may be taken e.g. from skin, mucosa, the surface of an eye or the like. The origin might be human, animal or plant. In addition to in-vitro applications, the term bio sample encompasses in vivo applications. For instance, the present invention finds interesting applications when imaging e.g. an organ in the body, using any well-know imaging systems, such as an ultrasound, X-ray, MR system or the like.

Coming back to in-vitro applications, the bio sample may particularly be a slice of body tissue. Moreover, the sample may be stained before the image is generated in order to make particular features of interest (better) visible. Accordingly, in the device of the invention, a sample preparation unit may optionally be included in which these steps can be executed. The method of the invention may also optionally comprise the generation of a slice of body tissue and/or the staining of the sample.

The characteristic may relate to cell or nuclei features, tissue morphology features, nuclei density, nuclei type, variation in cell or nuclei shape and the like. The characteristic may further relate to a heterogeneity parameter for each alternative region, preferably a percentage of tumor cells. The sample characteristic may in general be any type of characteristic that can be determined from the image of the sample, for example the local concentration of a given chemical substance (revealed e.g. via the colour of the substance). In a preferred embodiment, the sample parameter indicates the local amount/percentage of a particular cell type or tissue type. The sample parameter may for instance express the absolute or relative number of tumour cells in a given region. In particular, it may be the number and/or fraction of tumour cells in the image ROI. Knowing this number for the image ROI may provide important clues for a correct interpretation of the assay data that refer to this region.

The generated image of the sample is preferably a microscopic image, i.e. it reveals details not visible to the naked eye. The image may also be a histological image. Additionally or alternatively, it is preferably a digital image, thus allowing for the application of versatile digital image processing procedures. Furthermore, the image may be generated by scanning, i.e. by the sequential generation of sub images of smaller parts of the sample. The apparatus may accordingly comprise a digital microscope, particularly a digital scanning microscope, to allow for the embodiment of the aforementioned features. Furthermore, the generated microscopic image can be a bright field or fluorescence image, or a combination of different images.

In an example, the image analyzing unit comprises an automatic selecting and indicating unit and/or a user interface configured to select and indicate a region of interest in the image as reference region. The image analyzing unit, the automatic selecting and indicating unit and/or the user interface are also configured to enable the user to adjust e.g. the results of the automatic selection. In other words, the selection and indication of the ROI in the image may be done automatically by appropriate image processing routines, by the manual input of a user, or by a mixture of both. It is usually possible to generate an image ROI of nearly arbitrary shape and size. The device may preferably comprise an image analysis module, for example a digital microprocessor with associated software for the analysis of digital images. Additionally or alternatively, it may comprise a user interface comprising input means by which a user can input data referring to the selection of an image ROI. Typically, the user interface will also comprise output means, for example a display (monitor) on which the image of the sample can be shown, optionally together with a representation of the currently defined image ROI. The output means may preferably allow for a representation of the sample image with adjustable zooming factor. The image analyzer will typically be a digital data processing unit with appropriate image processing software by which the sample parameter can be determined automatically.

The image analyzing unit may be configured to define partially overlapping windows in the image, wherein for each window the characteristic is extracted and compared with the characteristic of the reference region. The image may be segmented by making use of a local response in form of a stain-uptake of one or more used and/or combined IHC-stains. Alternatively or additionally, the image analyzing unit may be configured to segment the image according to local amount and/or type of tumour cells into different sub-regions, wherein for each sub-region the characteristic is extracted and compared with the characteristic of the reference region. Alternatively or additionally, the image analyzing unit may be configured to segment the image according to local HER2-values (human epidermal growth factor receptor 2) into different sub-regions, wherein for each sub-region the characteristic is extracted and compared with the characteristic of the reference region. This will further be described with reference to the Figures.

In a further example, the image analyzing unit comprises a transfer unit configured to transfer a location of the reference region defined in a first bio sample to the corresponding region in a second bio sample and/or a respective image.

In an example, the examining device for processing and analyzing an image of a bio sample further comprises a nuclei detection unit configured to detect nuclei. Thereby, cells are extracted by an algorithm for nuclei detection. The nuclei detection unit may be configured to differ between different nuclei type (i.e. lymphocytes, epithelial cells, fat cells etc.) and to indicate nuclei with differing appearances.

In a further example, the display unit is configured to display the result of the analysis, which is the similarity in terms of the observed characteristic, by a color, color intensity, text, a letter, a number, a symbol and the like. Also the characteristic as such and/or a heterogeneity parameter can be displayed by a color, color intensity, text, a letter, a number, a symbol and the like. Also an overview of snapshots of the different regions is possible. The shapshots may or may not be ordered according to the observed characteristic.

In a further example of the present invention, an examining method for processing and analyzing an image of a bio sample is presented. It comprises the following steps, not necessarily in this order:
a) providing an image of a bio sample,
b) indicating a region of interest in the image as reference region,
c) extracting a characteristic of the reference region from the image,
d) analyzing the image for alternative regions with a similar characteristic, and
e) displaying the result of the analysis for alternative regions with a similar characteristic.

In other words and exemplarily, the method is based on the following steps: manual and/or automatic selection of a (reference) region of interest, identification of the cells, identification or characterization of the region of interest using extracted features, identification of alternative regions in the bio sample that exhibit similar characteristics as the selected region of interest, scoring of each alternative region (e.g. measurement of the percentage of lymphocytes or tumour cells and/or measurement of heterogeneity), and visual feedback of alternative regions on the screen.

In an example, it is also possible to provide an image of a bio sample, to extract from the image a characteristic for several regions, including the future reference region, to select a region of interest based on the characteristics, to indicate the region of interest in the image as reference region, to scan or analyze the image for alternative regions with a similar characteristic based on either the extracted characteristics or a new measurement, and to display the result of the scan for alternative regions with a similar characteristic.

In a further example of the present invention, a computer program is presented, wherein the computer program comprises program code means for causing a device as defined in the independent device claim to carry out the steps of the method as defined in the independent method claim, when the computer program is run on a computer controlling the device.

Applications of the invention may be molecular pathology applications, in particular oncology applications for patient stratification based on identification of molecular changes in cancer cells, but also for diagnostics/monitoring of other diseases.

It shall be understood that the examining device for processing and analyzing an image of a bio sample, the examining method for processing and analyzing an image of a bio sample, the computer program element for controlling such device and the computer readable medium having stored such computer program element according to the independent claims have similar and/or identical preferred embodiments, in particular, as defined in the dependent claims. It shall be understood further that a preferred embodiment of the invention can also be any combination of the dependent claims with the respective independent claim.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the accompanying drawings.

DETAILED DESCRIPTION OF EMBODIMENTS

The present invention is presented herein-after with reference to a practical case in the field of Digital Pathology, which is one of several preferred applications for use. However, as already explained, Digital Pathology shall be considered as one non limitative application example.

Pathology diagnostic investigation of patient material (tissue and cells) is the basis of many treatment decisions, in particular in oncology. Standard, thin slices from a biopsy are presented on microscope slides and stained according to certain protocols to visualize the morphology of the tissue. More recently, in situ staining for disease-specific biomarkers is being developed for companion diagnostics of targeted drugs. Assessment generally occurs with a bright field microscope.

Next to this form of analysis, tissue and cell biopsies are also investigated with molecular methods, like q-PCR (polymerase chain reaction) and sequencing. This so-called molecular diagnostics (MDx) is increasing in importance with the advent of new molecular biomarkers. Often, the pathologist decides based on the morphological information to run a molecular test to identify the biological characteristics of the (cancer) tissue for the right therapy choice. Since many molecular biomarkers cannot be quantified in situ on tissue—or at least not with the required precision—a separate molecular diagnostics test is performed. E.g., PCR or sequencing is carried out on a sample which is taken from the biopsy. In general, a second coupe that has already been taken from the biopsy is used. This tissue section is processed by cell lysis before the measurement of DNA or mRNA markers. As a consequence the spatial information is lost.

Tumour tissues generally consist of many different cell types, not only cancer cells and even the cancer cells can greatly differ in molecular constitution in different areas of the tumour. The result of the molecular analysis will depend on the exact composition of the tissue section which is used as sample for the molecular test. The more diluted the selected region is, the more insensitive and inconclusive the test results will be. In addition, heterogeneity within the cancer cell population will also cause noise in the MDx assays, reducing the sensitivity and specificity as well as the reproducibility. At present, there is no practical solution for a precise selection of sample material for molecular testing based on the pathology image. The manual selection which is done in many cases is inaccurate.

Currently, the ROI selection is done manually, which is inaccurate, as well as cumbersome. Besides, better or alternative regions in the tissue can be overlooked. Other regions can be better for different reasons. One reason can be that the region contains more cells/material for MDx. Another reason can be that the region is more homogeneous, improving the sensitivity and specificity as well as the reproducibility.

Figure 1:
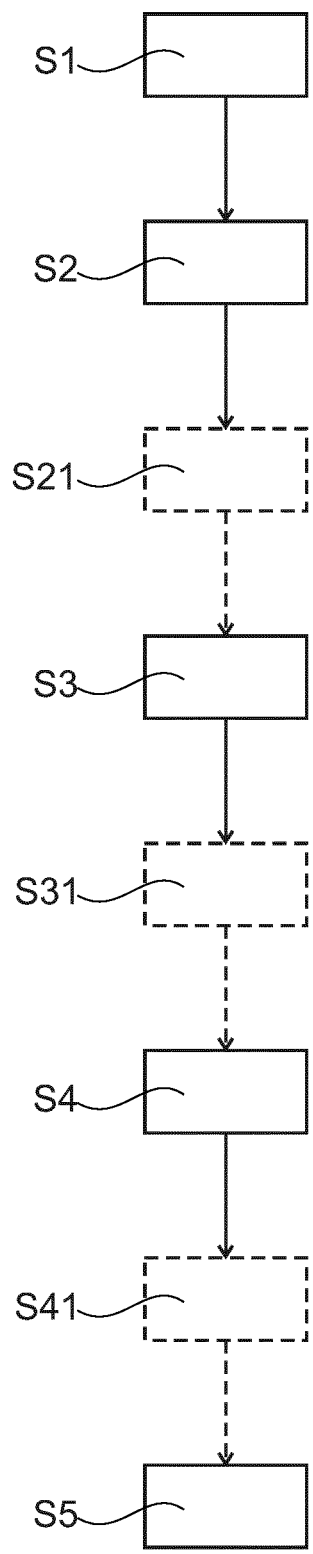
FIG. 1 shows schematically and exemplarily an embodiment of an examining method for processing and analyzing an image of a bio sample according to the invention.

FIG. 1 shows schematically and exemplarily an embodiment of an examining method for processing and analyzing an image of a tissue sample according to the invention. It comprises the following steps, not necessarily in this order:

a) step S1, providing an image of a tissue sample,
b) step S2, indicating a region of interest in the image as reference region,
c) step S3, extracting a characteristic of the reference region from the image,
d) step S4, analyzing the image for alternative regions with a similar characteristic, and
e) step S5, displaying the result of the analysis for alternative regions with a similar characteristic.

In step S1, an image of a tissue sample is provided by an interface unit, forming an interface to e.g. a digital microscope or a scanner.

Step S2 comprises a selecting and indicating of a region of interest in the image as reference region. There are at least two scenarios for the selection of the reference region of interest: b1), the region is automatically and/or manually selected in the tissue sample that is used for the molecular analysis, and/or b2), the region is automatically and/or manually be selected in a stained sample (e.g. H&E, IHC or else) that is always created in standard practise. Next, the stained sample is topologically aligned with a second tissue sample that is used for the molecular analysis. After alignment, the location of the corresponding ROI in the second sample is known.

Figure 2:
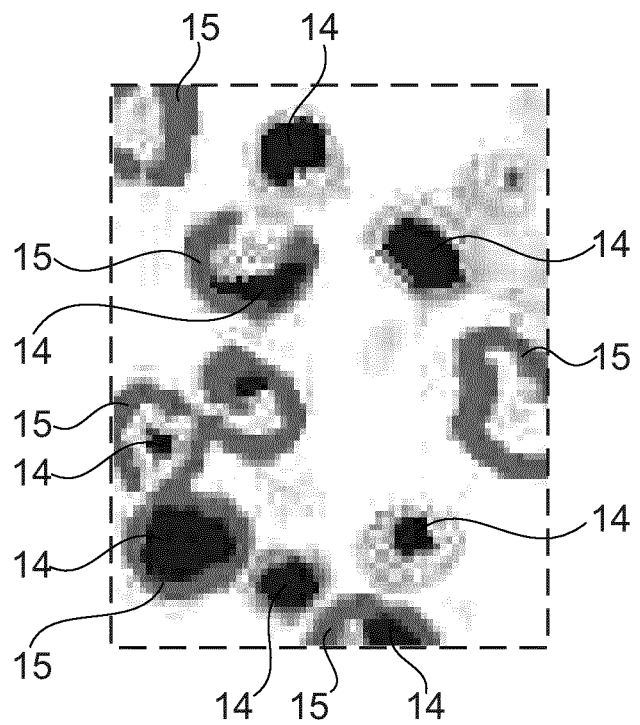
FIG. 2 shows schematically and exemplarily a detail of an output of a nuclei detection algorithm.

In a potential substep S21, see also FIG. 2, cells are extracted by an algorithm for nuclei detection. The algorithm provides a rough indication of different nuclei types, for example, nuclei with a compact appearance (like e.g. lymphocytes) and/or nuclei with a more transparent appearance (typical for epithelial cells and cancer cells).

In step S3, a characteristic of the reference region is extracted from the image, or in other words, the region of interest is characterized using at least one extracted feature. In a potential substep S31, a possible implementation is by determining the density of the objects in the ROI classified as tumour cells (e.g. as "nucleus with a transparent appearance"). The density is computed from the area "enclosed" by marked borders and the total tissue area in the ROI.

Step S4 comprises an analyzing of the image for alternative regions with a similar characteristic. A possible approach d1) for obtaining alternative regions is to use a sliding window implementation: a rectangular window is defined at partially overlapping locations. For each sliding window, the characteristics are calculated. These characteristics are compared to the characteristics of the reference region of interest. Regions with more or less similar characteristics are selected as candidate regions. Next, a score is assigned to each candidate region. For the application of MDx, e.g. the percentage of epithelial cells in each region is computed.

In a potential substep S41, the tumor cell percentage and/or the percentage of lymphocytes is estimated from the number of nuclei in the ROI that have been classified as "nucleus with a transparent appearance" and the total number of nuclei objects detected (i.e. the sum of the number of nuclei classified as "nucleus with a transparent appearance" and nuclei classified as "nucleus with a compact appearance"). The regions with an equal or higher percentage, compared to the reference region, are selected for the final step of visualization.

A further possible approach d2) for selection of alternative regions using a sliding window implementation is to segment the slide first. A possible implementation is to use the regions, created by the local IHC-scoring algorithm (see also FIG. 3 for a HER2-scoring algorithm). Then, for each segment the characteristics are calculated and compared with the characteristics of the reference region of interest (in analogy to the procedure above).

Step S5 comprises a visual feedback of alternative regions on the screen, in other words of the result of the scan for alternative regions with a similar characteristic. One way e1) to illustrate the alternative regions is by colouring the borders of alternative regions with a contrasting colour in the digital tissue image. The colour or the intensity of colour used to illustrate the regions can be a function of e.g. the percentage of tumour cells computed in that region. Another or a further way e2) is to highlight the relevant regions in overlay. Also an overview of thumbnails, each representing a potentially interesting ROI is possible.

FIG. 2 shows only for illustration a detail of an output of a nuclei detection algorithm. There are alternative implementations with different approaches. FIG. 2 is related to the potential substep S21, where cells are extracted by an algorithm for nuclei detection. The algorithm provides a rough indication of nuclei with a compact appearance (like e.g. lymphocytes) vs. nuclei with a more transparent appearance (typical for epithelial cells and cancer cells). The algorithm is based on the highly heterogeneous character of the nuclei and refers to two detectors, one focusing on the inner structure of the nuclei, and another concentrating on the line structure of the border of epithelial cells. The outputs of the detectors are merged and transferred into seeds using connected components. A globally optimal active contour algorithm is used to refine the border of the detected nuclei.

In an overlay shown in FIG. 2, the inner structure and the border of the nuclei are marked by e.g. different colours, or here different greyscales. Centre parts 14 indicate nuclei that have been detected as "nucleus with a compact appearance" (typically the lymphocytes) and border parts 15 indicate the border of nuclei that have been detected as "nucleus with a transparent appearance" (typically the epithelial cells). In a potential substep S41, the percentage of tumour cells is estimated from the number of nuclei in the ROI that have been classified as "nucleus with a transparent appearance" and the total number of nuclei objects detected (i.e. the sum of the number of nuclei classified as "nucleus with a transparent appearance" and nuclei classified as "nucleus with a compact appearance").

Figure 3:
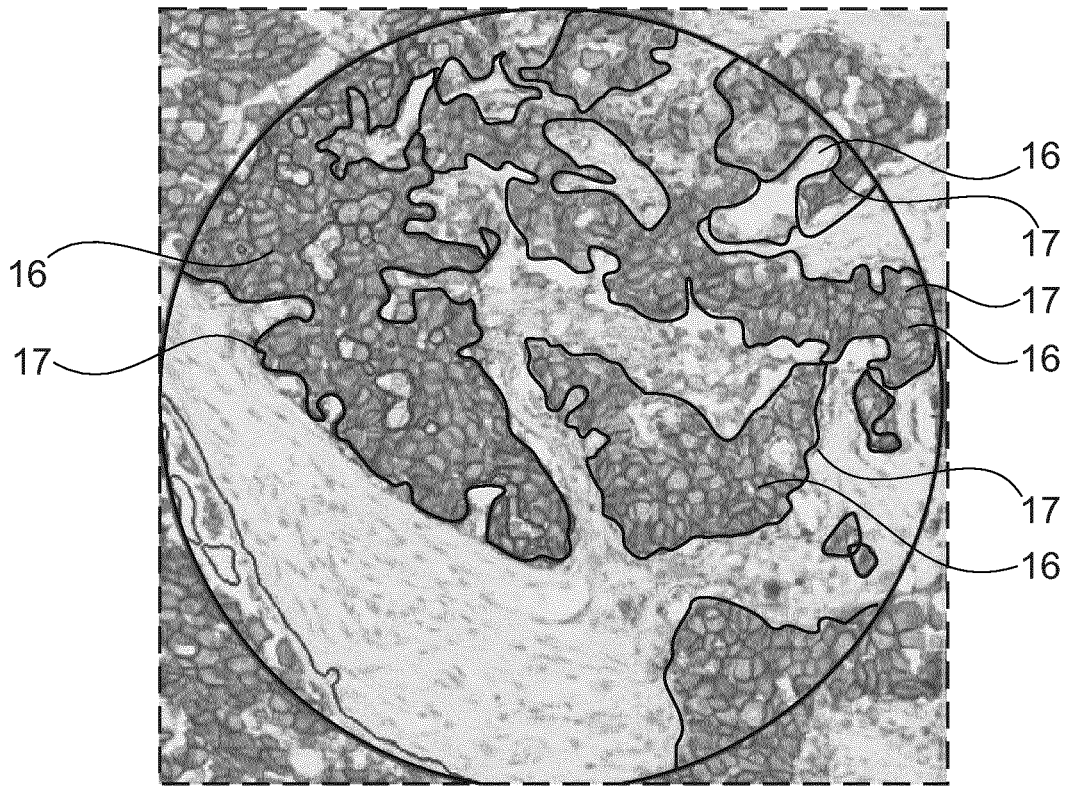
FIG. 3 shows schematically and exemplarily an example of a creation of regions based on a computation of a local HER2-score.

FIG. 3 is related to step S4, the analyzing of the image for alternative regions with a similar characteristic, using an IHC-stained slide (e.g. a HER2-stained slide). A possible implementation is to use regions created by a local HER2-scoring algorithm. The HER2 score has an important diagnostic value for breast cancer. An interpretation of HER2 membrane stained tissue requires differentiation between stain and counter stain, identification of the amount and completeness of staining uptake by the cell membrane and derivation of the percentage of tumour cells that exhibit over-expression. Furthermore, in case a sample contains multiple heterogeneous tumour regions, the scoring of each of these regions must be combined into a single score. Input of the algorithm is a manually selected tissue region.

FIG. 3 shows an example of a creation of regions 16 based on computation of the local HER2-score. Every region 16 comprising subregions with similar HER2-scores is surrounded by a superposed borderline 17. Thereby, regions 16 with different local HER2-score can be differentiated. The border 17 of a region 16 can be indicated by a unique colour, so that regions 16 with different local HER2-score can be indicated by different colours. Also an overlay with transparent regions of one or more colours is possible.

Figure 4:
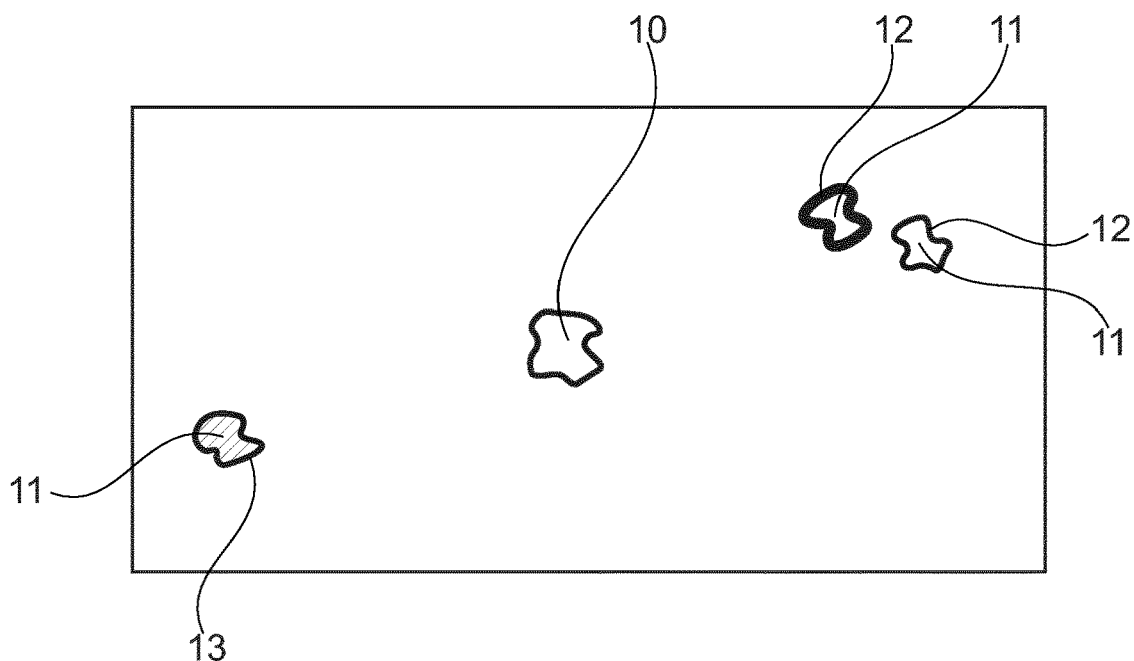
FIG. 4 shows schematically and exemplarily a visual feedback of a reference region and of alternative regions on the screen.

FIG. 4 is related to step S5 and shows a visual feedback of a reference region 10 and alternative regions 11 on the screen, in other words of the result of the scan for alternative regions 11 with a similar characteristic. Alternative regions 11 are illustrated by indicating, e.g. colouring their borders with a contrasting colour in the digital tissue image. The thickness of the borderline 12, the colour or the intensity of colour used to illustrate the regions can be a function of e.g. the percentage of tumour cells computed in that region. Further, it is possible to highlight the relevant regions in overlay 13.

Figure 5:
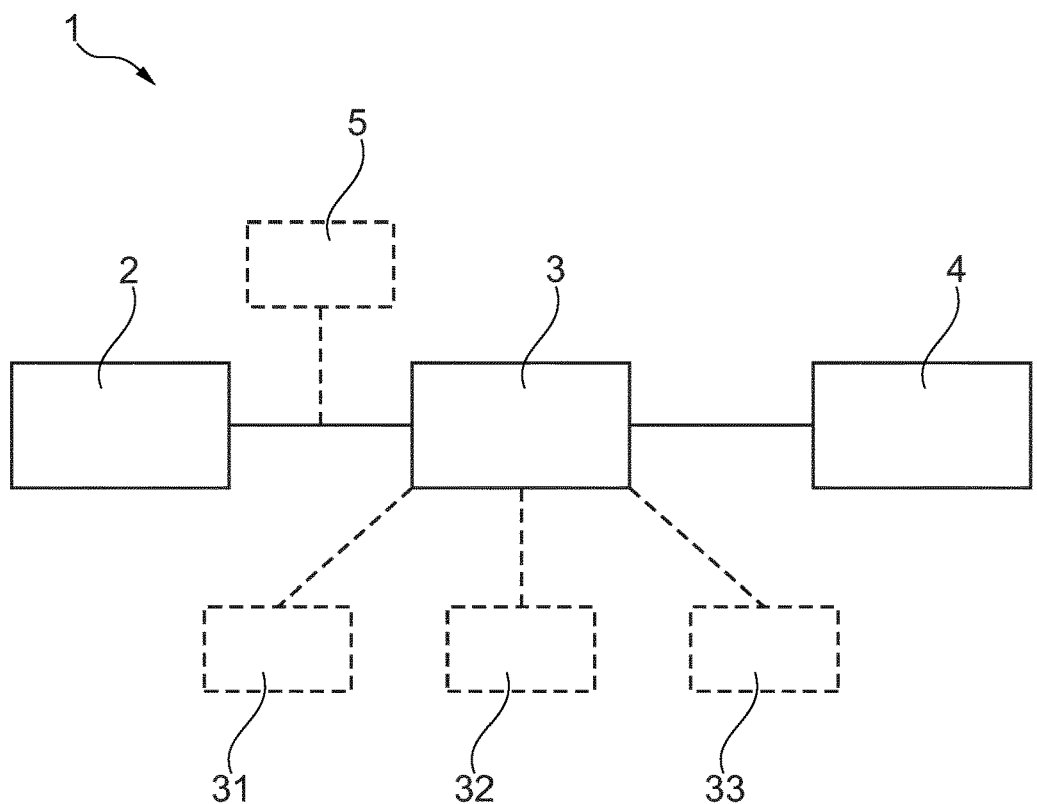
FIG. 5 shows schematically and exemplarily an examining device for processing and analyzing an image of a bio sample according to the invention

FIG. 5 shows an examining device 1 for processing and analyzing an image of a tissue sample according to the invention. It comprises an interface unit 2, an image analyzing unit 3, and a display unit 4. The interface unit 2 is configured to provide an image of a tissue sample. The image analyzing unit 3 is configured to indicate a region of interest in the image as reference region, to extract a characteristic of the reference region from the image and to analyze the image for alternative regions with a similar characteristic. The display unit 4 is configured to display the result of the analysis for alternative regions with a similar characteristic. The examining device 1 for processing and analyzing an image of a tissue sample may further comprise a nuclei detection unit 5, an automatic selecting and indicating unit 31, a user interface 32, and a transfer unit 33. The transfer unit 33 is shown exemplarily as part of the image analyzing unit 3 may also be arranged elsewhere.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An examining device for processing and analyzing an image of a bio sample, comprising:
   an interface configured to provide an image of a tissue sample;
   an image analyzing circuit configured to: provide an image of a bio sample; indicate a region of interest in the image as a reference region; and extract at least one of a cell and tissue characteristic of the reference region from the image to analyze the image for alternative regions with a similar characteristic to extract the at least one of the cell and tissue characteristic extracted from the reference region, wherein the at least one of the cell and tissue characteristic comprises a percentage of tumor cells in the region of interest and a percentage of lymphocytes estimated from a number of nuclei in the region of interest;
   a monitor configured to display a result of an analysis for alternative regions with a similar characteristic; and
   a nuclei detection circuit is configured to detect nuclei.

2. The examining device according to claim 1, wherein the nuclei detection circuit is configured to differ between different nuclei types.

3. The examining device according to claim 1, wherein the image analyzing circuit comprises an automatic selecting and extract at least one of indicating circuit and a user interface configured to select and indicate a region of interest in the image as reference region.

4. The examining device according to claim 1, wherein the image analyzing circuit comprises a transfer circuit configured to transfer a location of the reference region from a first bio sample to a corresponding region in at least one of a second bio sample and a respective image.

5. The examining device according to claim 1, wherein the image analyzing circuit is configured to define partially overlapping windows in the image, wherein for each window the at least one of the cell and tissue characteristic is extracted and compared with the at least one of the cell and tissue characteristic of the reference region.

6. The examining device according to claim 3, wherein the image analyzing circuit is configured to segment the image according to amount and at least one of a type of tumor cells and according to a local response to an IHC stain into different sub-regions, wherein for each sub-region the at least one of the cell and tissue characteristic is extracted and compared with the at least one of the cell and tissue characteristic of the reference region.

7. The examining device according to claim 1, wherein the monitor is configured to display the result of the analysis by a color, color intensity, text, a letter, a number, a symbol and the like.

8. The examining device according to claim 1, wherein the image is a histological image.

9. An examining method for processing and analyzing an image of a bio sample, for digital pathology, the method comprising:
   a) providing a microscopic image of a bio sample, wherein the bio sample is a tissue sample,
   b) indicating a region of interest in the image as a reference region,
   c) detecting nuclei and extracting at least one of a cell and tissue characteristic of the reference region from the image, wherein the at least one of the cell and tissue characteristic comprises a percentage of tumor cells in the region of interest and a percentage of lymphocytes estimated from a number of nuclei in the region of interest,
   d) analyzing the image for alternative regions with a similar characteristic to the at least one of the cell and tissue characteristic extracted from the reference region, and
   e) displaying a result of an analysis for alternative regions with a similar characteristic.

10. A non-transitory computer-readable storage medium storing machine readable instructions executable by a processor to perform the method of claim 9.

11. An examining device for processing and analyzing an image of a bio sample, comprising:
- an interface configured to provide an image of a tissue sample;
- an image analyzing unit configured to: provide an image of a bio sample; indicate a region of interest in the image as a reference region; and extract at least one of a cell and tissue characteristic of the reference region from the image to analyze the image for alternative regions with a similar characteristic to the at least one of the cell and tissue characteristic extracted from the reference region, wherein the at least one of the cell and tissue characteristic comprises a percentage of tumor cells in the region of interest and a percentage of lymphocytes estimated from a number of nuclei in the region of interest;
- a monitor configured to display a result of an analysis for alternative regions with a similar characteristic; and
- a nuclei detection unit is configured to detect nuclei.

12. The examining device according to claim 11, wherein the at least one of the cell and tissue characteristic relates to another heterogeneity parameter for each alternative region.

13. The examining device according to claim 11, wherein the image analyzing unit comprises an automatic selecting and at least one of an indicating unit and a user interface configured to select and indicate a region of interest in the image as reference region.

14. The examining device according to claim 11, wherein the image analyzing unit comprises a transfer unit configured to transfer a location of the reference region from a first bio sample to a corresponding region in a second bio sample and/or a respective image.

15. The examining device according to claim 11, wherein the image analyzing unit is configured to define partially overlapping windows in the image, wherein for each window the at least one of the cell and tissue characteristic is extracted and compared with the at least one of the cell and tissue characteristic of the reference region.

16. The examining device according to claim 15, wherein the image analyzing unit is configured to segment the image according to amount and type of tumor cells and/or according to a local response to an IHC stain into different sub-regions, wherein for each sub-region the at least one of the cell and tissue characteristic is extracted and compared with the at least one of the cell and tissue characteristic of the reference region.

17. The examining device according to claim 11, wherein the monitor is configured to display the result of the analysis by a color, color intensity, text, a letter, a number, a symbol and the like.

18. The examining device according to claim 11, wherein the image is a histological image.

19. The examining device according to claim 11, wherein the at least one of the cell and tissue characteristic further relates to a heterogeneity parameter for each alternative region.

* * * * *